United States Patent
Li et al.

(10) Patent No.: US 11,546,348 B2
(45) Date of Patent: Jan. 3, 2023

(54) DATA SERVICE SYSTEM

(71) Applicant: Silver Rocket Data Technology (Shanghai) Co., Ltd, Shanghai (CN)

(72) Inventors: Jia Li, Shanghai (CN); Yi Yuan, Shanghai (CN); Xiaoliang Pan, Shanghai (CN); Qing Yan, Shanghai (CN)

(73) Assignee: Silver Rocket Data Technology (Shanghai) Co., Ltd., Shanghai (CN)

(*) Notice: Subject to any disclaimer, the term of this patent is extended or adjusted under 35 U.S.C. 154(b) by 275 days.

(21) Appl. No.: 16/409,822

(22) Filed: May 12, 2019

(65) Prior Publication Data
US 2020/0213331 A1    Jul. 2, 2020

(30) Foreign Application Priority Data

Dec. 27, 2018  (CN) .......................... 201811611365.2
Dec. 27, 2018  (CN) .......................... 201811613014.5

(51) Int. Cl.
*H04L 9/40* (2022.01)
*G06F 16/25* (2019.01)
(Continued)

(52) U.S. Cl.
CPC .......... *H04L 63/123* (2013.01); *G06F 16/245* (2019.01); *G06F 16/248* (2019.01);
(Continued)

(58) Field of Classification Search
CPC .............. H04L 63/123; H04L 63/0428; H04L 63/0442; G06F 16/245; G06F 16/248; G06F 16/252
See application file for complete search history.

(56) References Cited

U.S. PATENT DOCUMENTS 10,411,897 B2 * 9/2019 Paolini-Subramanya ................... G06F 21/64
2006/0225047 A1 * 10/2006 Brothers ............... G06F 9/5044
717/127

(Continued)

OTHER PUBLICATIONS

Storing scripts (smart contracts) outside the blockchain. Bitcoin Stack Exchange. Mar. 14, 2016 (retrieved on Apr. 2, 2021). <URL: https://www.active-directory-security.com/2014/05/An-Automated-Kerberos-Token-Size-Calculation-Tool.html> (Year: 2016).*

(Continued)

*Primary Examiner* — Chau Le
*Assistant Examiner* — Zhe Liu
(74) *Attorney, Agent, or Firm* — Fideli Law PLLC (57) ABSTRACT

A system may be disclosed in the present disclosure, comprising: an interface service unit configured to perform at least one of sending data to or receiving data from one or more users via a user interface; and a transmission unit including: a blockchain adaptor configured to transmit data to a plurality of different types of blockchains, via a blockchain interface, according to data format and communication mode requirements of each of the plurality of different types of blockchains and a transmission controller configured to trigger a smart contract running on a blockchain of the plurality different types of blockchains via the blockchain interface, and control a data transmission under instructions from the smart contract, wherein the data transmission is based on data received from the user interface.

20 Claims, 5 Drawing Sheets

(51) Int. Cl.
    *G06F 16/245*    (2019.01)
    *G06F 16/248*    (2019.01)

(52) U.S. Cl.
    CPC ........ *G06F 16/252* (2019.01); *H04L 63/0428* (2013.01); *H04L 63/0442* (2013.01)

(56) References Cited

U.S. PATENT DOCUMENTS

| | | | | |
|---|---|---|---|---|
| 2016/0063219 | A1* | 3/2016 | Vlot | G06F 21/44 |
| | | | | 713/168 |
| 2017/0155628 | A1* | 6/2017 | Rohloff | H04L 63/02 |
| 2017/0232300 | A1* | 8/2017 | Tran | A63B 71/06 |
| | | | | 434/247 |
| 2018/0268151 | A1* | 9/2018 | Cuomo | G06F 21/645 |
| 2019/0172026 | A1* | 6/2019 | Vessenes | H04L 9/3247 |
| 2019/0279206 | A1* | 9/2019 | Song | G06F 16/1805 |
| 2019/0303121 | A1* | 10/2019 | Padmanabhan | G06F 9/44505 |
| 2019/0319798 | A1* | 10/2019 | Chalkias | H04L 9/3239 |
| 2019/0340266 | A1* | 11/2019 | Vo | G06F 16/27 |
| 2019/0340586 | A1* | 11/2019 | Sheng | G06Q 20/367 |
| 2020/0005292 | A1* | 1/2020 | Mao | H04L 9/3247 |
| 2020/0117733 | A1* | 4/2020 | Mueller | G06F 16/2379 |
| 2020/0265516 | A1* | 8/2020 | Xu | G06Q 40/04 |
| 2020/0273026 | A1* | 8/2020 | Soni | H04L 9/0643 |
| 2020/0311094 | A1* | 10/2020 | Opferman | H04L 63/123 |
| 2021/0320972 | A1* | 10/2021 | Basu | H04L 67/1059 |

OTHER PUBLICATIONS

"Adapter (general)" and "Relaying". The Authoritative Dictionary of IEEE Standard Terms. p. 16, 957; 7th edition; 2000 (Year: 2000).*
Beyer. Blockchain Interoperability—Moving Assets Across Chains. Medium—Cryptronics. Nov. 5, 2018 [retrieved on Dec. 9, 2021], <URL: https://medium.com/cryptronics/blockchain-interoperability-moving-assets-across-chains-e5203357d949> (Year: 2018).*
"Off-Chain;" CryptoWiki, 2019; retrieved from the Internet: <URL: cryptowiki.me/index.php?title=Off_Chain&direction=prev&oldid=11134>(Year: 2019).*
Patrick McCorry; "Infura: Guide to Sidechains & Rollups"; Infura Blog, 2021; retrieved from the internet: <URL: https://blog.infura.io/offchain-protocols-sidechains-and-rollups/> (Year: 2020).*
Barinov, Igor; 'How to select a network id or is there a list of network ids'; In Ethereum Stack Exchange [online], 2017; <URL: https://ethereum.stackexchange.com/questions/17051/how-to-select-a-network-id-or-is-there-a-list-of-network-ids> (Year: 2017).*
Eulberg, Peter; "Overview of 17 Ethereum Blockchain Networks"; Anyblock Analytics, 2020; <retrieved from the internet: https://www.anyblockanalytics.com/blog/ overview-ethereum-blockchain-networks/> (Year: 2020).*
He et al., "Non-Transferable Proxy Re-Encryption Scheme," 2012 5th International Conference on New Technologies, Mobility and Security (NTMS), 2012, p. 1-4 (Year: 2012).*
Renjith et al. "Verifiable El-gamal re-encryption with authenticity in cloud," 2013 Fourth International Conference on Computing, Communications and Networking Technologies (ICCCNT), 2013, p. 1-5 (Year: 2013).*

* cited by examiner

DATA SERVICE SYSTEM

CLAIM OF PRIORITY

This application claims priority to Chinese Application number 201811613014.5, filed on Dec. 27, 2018 and Chinese Application number 201811611365.2, filed on Dec. 27, 2018 which is incorporated herein by reference.

TECHNICAL FIELD

The present application relates to data processing, and more particularly, but not exclusively, to a data service system.

BACKGROUND

With the development of blockchain technology, more and more data may be transmitted through the blockchain. The types of data to be transmitted are numerous, and the contents of data are very diverse.

How to provide support for transmitting diverse data has become an urgent problem to be solved.

SUMMARY

The technical problem solved by the embodiment of the present disclosure is to provide a data service system capable of supporting diverse data transmission and data exchange.

To solve the above-mentioned technical problem, an aspect of the present disclosure provides a data service system, comprising: an interface service unit having a user interface (an interface for user terminal) configured to perform data interaction with a user terminal; and a transmission unit configured to provide a data transmission service, including a blockchain adaptor configured to transmit data to a plurality of different types of blockchains, via a blockchain interface, according to data format and communication mode requirements of each of the plurality of different types of blockchains and a transmission controller configured to trigger a smart contract running on a blockchain of the plurality different types of blockchains via the blockchain interface and control a data transmission under instructions from the smart contract, wherein the data transmission is based on data received from the user interface.

The user interface is configured to receive a data request for transmitting data, wherein the transmission unit is further configured to send a smart contract template to the user interface according to the data request and generate a smart contract, based on the smart contract template, that matches the data request according to response information obtained from the user interface.

The data request includes information of a target blockchain, and the transmission unit is configured to obtain a data format requirement of the target blockchain from the plurality of different types of blockchains and convert the data to conform with the data format required by the target blockchain, and the blockchain adaptor is configured to send the smart contract to the target blockchain, via the blockchain interface, according to a communication mode requirement of the target blockchain.

The system further comprises a data service unit configured to provide a data processing service and including a target data generator sub-unit configured to generate target data supporting data transmission based on data received through the user interface and the transmission unit configured to perform control on a data transmission process of the target data under supervision of the smart contract.

The one or more users include a data provider and a data requestor, and the data service unit having a search service sub-unit is further configured to generate search index data based on data received from the data provider and search the data based on the search index for the data requestor.

Alternatively, the transmission controller is configured to trigger the smart contract running on the blockchain via the blockchain interface according to a confirmation from the data requestor on search results provided by the search service sub-unit.

The data service unit further includes a storage adapter configured to respectively communicate with one or more centralized database, decentralized database and smart terminal devices and determine a data storage location during the data transmission process via the user interface.

The one or more users include a data provider and a data requestor and the data service unit is further configured to obtain verification data from data provided by the data provider via the user interface and upload the verification data to the blockchain via the blockchain interface, the verification data is configured to verify the target data by the data requestor.

The data service unit is further configured to obtain original data corresponding to the target data and verify the original data and the transmission unit is further configured to invoke the data service unit to verify the original data and trigger the target data generator to generate the target data after passing verification.

The target data generator is configured to encrypt data received from the user to generate the target data.

Alternatively, the target data generator is configured to encrypt data received from the data provider based on information of the data provider and information of the data requestor.

The system further comprises a data analysis service unit configured to receive analysis requirement information from the user interface, the analysis requirement information indicating an analysis requirement to the data, analyze and calculate data obtained from the user interface according to the analysis requirement information to obtain an analysis result and return the analysis result via the user interface in response to the analysis requirement information.

Another aspect the present disclosure provides a method, comprising: triggering a smart contract running on a blockchain of a plurality different types of blockchains via a blockchain adaptor, wherein the blockchain adaptor is configured to transmit data to the plurality of different types of blockchains according to data format and communication mode requirements of each of the plurality of different types of blockchains and controlling a data transmission under instructions from the smart contract, wherein the data transmission is based on data received from a user interface.

The method further comprises receiving a data request for transmitting data from a user interface; sending a smart contract template to the user interface according to the data request; and generating a smart contract, based on the smart contract template, that matches the data request according to response information obtained from the user interface.

The data request includes information of a target blockchain, and the method further includes obtaining a format requirement of the target blockchain from the plurality of different types of blockchains and converting the data to conform with the data format requirement by the target blockchain; and sending the smart contract to the target blockchain, via the blockchain adaptor, according to a communication mode requirement of the target blockchain.

The method further comprises generating target data supporting data transmission based on data received through the user interface; and performing control on a data transmission process of the target data under supervision of the smart contract.

The method further comprises respectively communicating with one or more centralized database, decentralized database and smart terminal devices and determining a data storage location during the data transmission process via the user interface.

The method further comprises obtaining verification data from data provided by at least one data provider via the user interface and uploading the verification data to the blockchain via the blockchain adaptor, wherein the verification data is configured to verify the target data by the data requestor.

The method further comprises obtaining original data corresponding to the target data and verify the original data and verifying the original data and generating the target data after passing verification.

The method further comprises encrypting data received from the data provider based on information of the data provider and information of the data requestor.

The technical solutions of the embodiment of the present disclosure have the following beneficial effects compared with the prior art:

In the embodiment of the present disclosure, a user interface configured to perform data interaction with a user terminal may be provided with the interface service unit; a blockchain adaptor configured to transmit data to the blockchain may be provided with the transmission unit; and the smart contract running on the blockchain may be triggered by the transmission controller in the transmission unit to control data transmission process, thereby providing data service for diverse data transmission requirements, so that parties of the data transmission may complete the data transmission through the data service system in the embodiments of the present disclosure.

Further, based on the data request of the data transmission, the smart contract template corresponding to the data request may be provided through the user interface, and the smart contract matching the data request may be determined, the smart contract template and the smart contract may be determined according to the service requirement, and the generated smart contract corresponds to different data transmission scenarios to provide diverse data transmission services.

Further, according to the requirements of the blockchain on the data format and the communication mode, the blockchain adapter performs data transmission with the blockchain through the blockchain interface, so that the data transmission between the blockchain interface and the blockchain may conform to the requirements of the communication mode and the data format of the blockchain, and the user terminal does not need to learn the specific way of data transmission with different blockchains, thereby improving the user terminal experience.

Further, the data received from the user terminal may be converted into a data format conforming to the requirement of the blockchain by the blockchain adapter, so that the data interacting with the blockchain may conform to the data format requirement of the blockchain without requiring the user terminal to learn the specific format, which in turn may enhance the user terminal experience.

Further, by uploading the verification data to the blockchain, the verification data for verifying the target data uploaded to the blockchain may be unchangeable, so that after the data transmission, the obtained target data may be verified to verify the authenticity of the obtained data based on the verification data on the blockchain by the data requestor.

Further, the original data corresponding to the target data may be obtained by the verification service sub-unit, and the original data may be verified by the verification service sub-unit invoked by the verification invoker sub-unit. After passing the verification, the target data may be generated by the target data generator sub-unit, thereby improving the validity of the generated target data, increasing the probability of success for data transmission and reducing the waste of system resources.

Further, the target data generator sub-unit performs encryption operation on the data obtained from the data provider to generate encrypted data, which may prevent the data from being abnormally obtained in the absence of the decryption key, thereby enhancing the security of the data transmission.

Further, the target data generator sub-unit encrypts the data received the data provider based on the information of the data provider and the information of the data requestor, so that the generated encrypted data may be targeted; and the target data only corresponds to the data provider and the data requestor, so that the security of the data transmission may be improved.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

DETAILED DESCRIPTION

Various aspects and examples of the disclosure will now be described. The following description provides specific details for a thorough understanding and enabling description of these examples. Those skilled in the art will understand, however, that the disclosure may be practiced without many of these details. Additionally, some well-known structures or functions may not be shown or described in detail, so as to avoid unnecessarily obscuring the relevant description.

The terminology used in the description presented below may be intended to be interpreted in its broadest reasonable manner, even though it may be being used in conjunction with a detailed description of certain specific examples of the disclosure. Certain terms may even be emphasized below, however, any terminology intended to be interpreted in any restricted manner will be overtly and specifically defined as such in this Detailed Description section.

As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments in the present disclosure. It may be to be expressly understood, the operations of the flowchart may or may not be implemented in order. Conversely, the operations may be implemented in inverted order, or simultaneously. Moreover, one or more other operations may be added to the flowcharts. One or more operations may be removed from the flowcharts As described above, how to support diverse data transmissions has become an urgent problem to be solved.

In some embodiments, an interface service unit may be configured to interact with a user terminal via a user interface. These embodiments also provide a transmission unit configured for data transmission with the blockchain through a blockchain controller via a blockchain interface transmission unit, and a smart contract running on the blockchain may be triggered via the blockchain interface through a transmission controller in the transmission unit. The transmission of data may be controlled so that data services may be provided for diverse data transmission requirements, so that parties to the data transmission may complete data transmission through the data service system in the embodiment of the present disclosure. The above described objects, features, and advantages of the present disclosure will become more apparent and understood.

Figure 1:
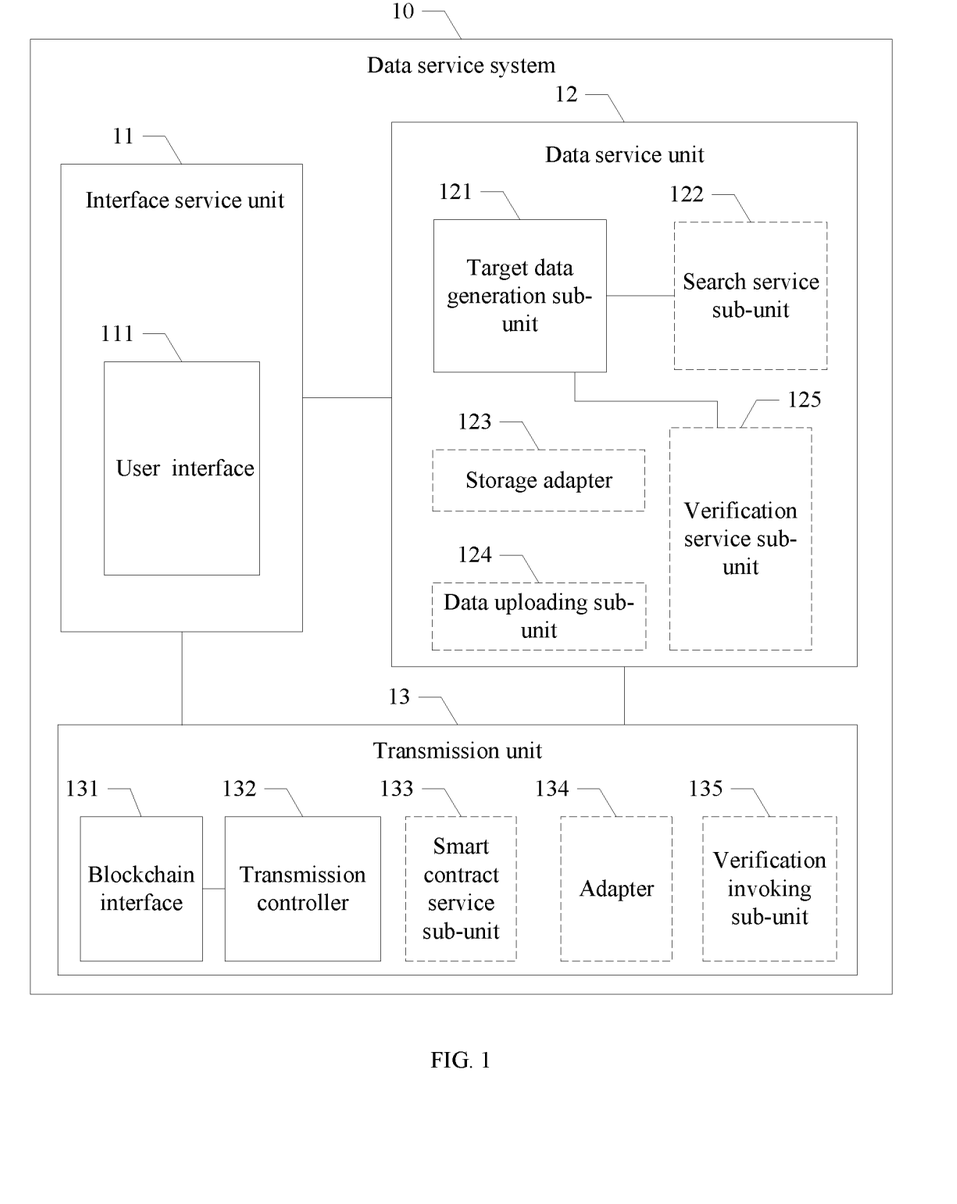
FIG. 1 is a schematic structural diagram of a data service system according to embodiments of the present disclosure.

Referring to the structural diagram of a data service system shown in FIG. 1, in the embodiment of the present disclosure, the data service system 10 may include:

An interface service unit 11 having a user interface 111 (an interface for user terminal) configured to perform data interaction with a user terminal; and A transmission unit 13 being configured to provide a data transmitting service. The transmission unit 13 may include a blockchain interface 131 configured to perform data transmission with a blockchain, and a transmission controller 132. The transmission controller 132 may be configured to trigger a smart contract running on the blockchain through the blockchain interface 131 and control the data transmission process. The data transmission process may be based on data received from the user interface 111.

In some embodiments, the data service system 10 may receive data from the interface service unit 11 or process the processed data based on the received data. Then, the transmission controller 132 may trigger/activate the smart contract upload to the blockchain through the blockchain interface 131. The user terminal may query through the blockchain, or the data service system 10 may also provide the query service through the interface service unit 11.

In the embodiment of the present disclosure, the data transmission may be data transmission in multiple scenarios. For example, the data transmission may be a data transmission, or it may be other delivery of data. Specifically, taking the vehicle data as an example, the data transmission may be data transmission in a process of vehicle P2P (Peer-to-Peer), vehicle insurance, maintenance, and vehicle network consumption.

It can be understood by those skilled in the art that the above-mentioned data transmission process may be used as a data transmission if it involves the sharing of economic benefits. Or the process of data transmission described above may also be other data transmission processes that do not involve economic benefits. The word "transmission" may not necessarily be a limitation on the scope of protection but may be merely an example of a scenario within the scope of protection of the present disclosure. All the technical solutions adopting the data transmissions in the embodiments of the present disclosure are all within the protection scope of the present disclosure and are not limited herein.

The data service system 10 in the embodiment of the present disclosure may interface with different blockchains, thereby providing a user interface for each user terminal of the data transmission, providing flexible and diverse choices. The user terminal may select each unit provided in the embodiment of the present disclosure in different application scenarios according to the service requirement. The individual units may be used separately or in combination, and the user terminal does not need to separately perform different flow control of data in different blockchains. Through this arrangement, the data service system 10 may improve the efficiency of data transmission and control, thereby improving the user terminal experience.

The blockchain may be a chained data structure in which data blocks are sequentially connected in a chronological order and may be a cryptographically guaranteed non-tamperable and unforgeable distributed ledger. A blockchain may include a public chain, a private chain, or a coalition chain.

The public chain may be a decentralized chain, and the data uploaded to the public chain cannot be tampered with. A private chain may be a private blockchain. It refers to a blockchain whose write permissions are entirely in the hands of an organization. All nodes participating in this blockchain are strictly controlled. A consortium blockchain refers to a blockchain in which several organizations or institutions participate in management. Each organization or institution controls one or more nodes to collectively record target data. And only these organizations and institutions may read, write, and send data to the chain.

A smart contract may be a piece of code that runs on a blockchain. The logic of the code defines the content of the smart contract convention. The contract's account retains the operating status of the contract. In some embodiments of the invention, the smart contract controls the transmission process of the data transmission.

A user terminal may be a device operated by the user terminal. For example, the user terminal may be a terminal device such as a handheld terminal, an in-vehicle device, or a tablet device, or may be a single computer, a server, or a server cluster. The type of user terminal is not limited herein.

In some embodiments, the user terminal may be corresponding to a data provider, or may be corresponding to a data requestor. The data for data interaction with the user interface 111 may include a variety of target data. For example, taking the vehicle data as an example, the data for data interaction with the user interface 111 may be data obtained from the smart vehicle hardware, or the vehicle data collected by the sensor, or the acquired third party data. This application does not limit this.

The data service system 10 may support a plurality of data transmission processes and access systems corresponding to the services of the plurality of data transmission scenarios. Taking the vehicle data as an example, as described above, the data service system 10 may be used for data services such as automobile insurance, maintenance, P2P vehicle sharing, and vehicle networking consumption.

The following examples are briefly explained. For example, in a scenario shared by a P2P vehicle, the data received by the data service system 10 from the interface service unit 11 may include identity information of both parties, key flow information shared by the vehicle, selection information for the smart contract template, and the like. The transmission controller 132, the smart contract may be deployed according to the selection of the smart contract template, the smart contract running on the blockchain may be triggered/activated, and data interaction may be performed, so that the service requirements in the scenario can be realized. Please refer to the following for further details.

Alternatively, in the scenario of the used vehicle transaction, the data received from the interface service unit 11 may include the factory data of the new vehicle, the data related to the state of the vehicle generated during the use of the new vehicle, the maintenance data, etc., or include other transaction-related data, as well as information on the selection of smart contract templates. Similar to the P2P vehicle sharing scenario, the transmission controller 132 may be used to deploy the smart contract according to the selection of the smart contract template, trigger/activate the smart contract running in the blockchain, and perform data interaction, etc., thereby realizing service requirements in the used vehicle transaction scenario.

In different application scenarios, the data received by the data service system 10 from the interface service unit 11 may be data collected by the collection device and identity data of the user terminal. Alternatively, the data received by the data service system 10 from the interface service unit 11 may also be data selected or input by the user terminal, or other various data. The data service system 10 may process the data according to the data type received by the interface service unit 11, and may access various applications corresponding to multiple scenarios. Through the above operations, the data service system 10 may lower the development threshold.

Data transactions are important scenarios in various data transmission scenarios. In data trading scenarios, data transmission has more requirements for data. For example, data security, data privacy, and the like.

In some embodiments, data service system 10 may also include data service unit 12. The data service unit 12 may be configured to provide a data processing service, which may include a target data generation sub-unit 121. The target data generation sub-unit 121 may be configured to generate target data supporting data transmissions based on data received through the user interface 111.

Correspondingly, the transmission unit 13 may be configured to perform control of the data transmission process on the target data.

The data service unit 12 may generate target data, which provides a basis for improving security and privacy in the data transmission process. Thus, for various types of data transmissions, including transmissions with privacy data, the data service unit 12 may provide support. The above data service system 10 will be further described below with reference to FIGS. 1 and 2.

The data service system 10 may acquire data from the user terminal 21 through the user interface 111. The user terminal 21 may be a data provider. Although a user terminal 21 may be taken as an example in FIG. 1, it may be understood that the number of the user terminals 21 may be plural, and may include a user terminal 21 as a data provider and a user terminal 21 as a data requestor.

Figure 2:
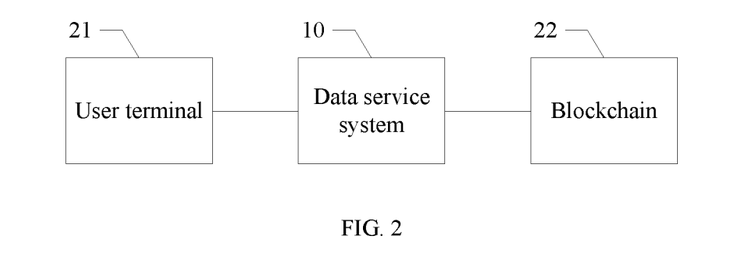
FIG. 2 is a schematic structural diagram of a data transmission system according to embodiments of the present disclosure.

The user terminal 21 as a data provider may be a data provider device. For example, the user terminal 21 may be an intelligent in-vehicle hardware, a collection device, or a third party from cloud. The user terminal 21 as a data requestor may be, for example, a manufacturer, an insurance company, an individual, or a service provider who wants to acquire data. Blockchain 22 may be Ethereum (ETH), Commercial Distributed Design Blockchain Operating System (EOS) or other blockchain 22, and the like.

The data acquired by the data service system 10 from the user terminal 21 through the user interface 111 may be acquired from the user terminal 21 as the data provider described above. The data may be data of a unified format collected by the smart vehicle hardware, or unprocessed data collected by the entire vehicle equipped with the collection device, or third-party data downloaded by a third party in the cloud. For example, in the case of vehicle data, the third-party data may be data that the vehicle factory processes and uploads to the cloud.

The data service system 10 may store the data provided by the data provider locally or upload it to the blockchain 22. When the data requestor needs to purchase data, the blockchain 22 may run smart contracts for data transmissions.

Specifically, the data service system 10 may include a target data generation sub-unit 121, and the target data generation sub-unit 121 may generate target data based on the acquired data. The transmission controller 132 may trigger the smart contract running on the blockchain 22 through the blockchain interface 131 to control the transmission process of the data transmission. The data requestor and the data provider may perform data interaction based on the data service system 10 through the user terminal 21.

With the data service system 10 described in the above embodiment, the target data generation sub-unit 121 in the data service unit 12 may generate target data based on the data received from the user interface 111, and the transmission controller 132 in the transmission unit 13 may trigger/activate the smart link running on the blockchain 22 through the blockchain interface 131 to perform data transmissions on the target data, thereby providing data services for the user terminal's diverse transaction needs and satisfying the transaction needs of the user terminal.

Referring back to FIGS. 1 and 2, in some embodiments, the user interface 111 may be configured to interact with data providers and data requestors. The data service unit 12 may further include a search service sub-unit 122. The search service sub-unit 122 may be configured to generate index data based on data received from the user terminal 21 as the data provider for searching by the user terminal 21 as the data requestor.

As previously mentioned, the data received from the data provider via the user interface 111 may be varied. For example, the data received from the data provider may be data received from an intelligent in-vehicle hardware, a collection device, or a cloud third party, and may specifically be data having a uniform format, or unprocessed data collected by the sensor, or third-party data downloaded by a third party in the cloud. The search service sub-unit 122 may perform different processing on the received data depending on the data received from the data provider. The different processing methods for the received data by the search service sub-unit 122 will be described below.

In an application scenario, data received from a data provider may include original plaintext description data, verification data, and encrypted data encrypted by intelligent in-vehicle hardware.

The original plaintext description data may include related description information of the data, for example, may include information such as a time period in which the data may be generated, an area in which the data may be formed, a data generator device, and the like; and the encrypted data may be encrypted according to the plaintext data collected by the sensor. The verification data may be data used to verify the plaintext data. The verification data may be irreversibly converted from the plaintext data, that is, different plaintext data corresponds to different verification data, but the plaintext data cannot be restored according to the verification data. In this way, the data requestor may verify the data, improve the security of the data transmission, and protect the data privacy because the verification data may be irreversible.

The search service sub-unit 122 may add the original plaintext description data to the database of the search engine. The data requestor may use the original plaintext description data as the index data to search through the search engine. For example, when the data are data obtained from the smart vehicle hardware, the original plaintext description data may be data generated after being processed by the intelligent vehicle hardware, and the data requestor may directly search using the original plaintext description data.

The search service sub-unit 122 may also translate the original plaintext description data using a data dictionary to obtain plaintext description data, and then add the plaintext description data to the database of the search engine. The data requestor may search the plaintext description data as the index data.

For example, when the data received from the data provider are data collected by the sensor, the uploaded data may be "p_vehicle": "Vehicle$4kPKdXjome". The search service sub-unit 122 may sort and convert the original plaintext description data collected by the sensor by using the data dictionary. For example, the search service sub-unit 122 may convert "p_vehicle": "Vehicle$4kPKdXjome" to "vehicle identification": "Vehicle$4kPKdXjome", thereby obtaining plaintext description data corresponding to the original plaintext description data.

The search service sub-unit 122 may use the data dictionary to translate the original plaintext description data to obtain plaintext description data for the search engine, thereby facilitating the search of the search engine, and improving the efficiency of the data search. Moreover, the search service sub-unit 122 may perform translation on the data to obtain plaintext description data, which may improve the probability that the data are searched, and may improve the search performance of the search engine.

In some embodiments, the search service sub-unit 122 may expand the data dimension based on the original plaintext description data provided by the data provider, and the data requestor may perform the search by using the expanded data as the index data.

For example, the original plaintext description data may include a specific vehicle identification number (VIN), and the search service sub-unit 122 may acquire information such as a vehicle model, a vehicle origin, a vehicle age, and the like corresponding to the vehicle identification number, and associate the acquired information to the plaintext description data of the vehicle data, thereby expanding the data dimension of the vehicle data.

The search service sub-unit 122 may obtain other data associated with the preset data dimension from the original plaintext description data and associate the other data to the plaintext description data. The data requestor may search the data in plaintext as index data. Thus, the search service sub-unit 122 may extend the data dimension of the plaintext description data. Search engines may perform data searches from more data dimensions, which may increase the probability that data will be searched. Moreover, search engines may search data from more data dimensions and improve the accuracy of data search.

In another application scenario, the data obtained from the data provider may be the vehicle data collected by the sensor, and specifically may be unprocessed plaintext data. The user interface 111 acquires data from the data provider, and then the target data generation sub-unit 121 may perform an irreversible operation on the acquired data to generate verification data corresponding to the plaintext data. The irreversible operation may be a hash operation. For example, the irreversible operation may be SHA256 or SHA3. And the search service sub-unit 122 may obtain index data according to the plaintext data for the data requestor to search through the search service sub-unit 122 of the user terminal 21.

In some embodiments, the data requestor may perform a data search through the search service sub-unit 122 to find data that meets the data requirements.

Further, the transmission controller 132 may be configured to trigger/activate the smart contract running on blockchain 22 through the blockchain interface 131 upon receiving a confirmation of the search result, wherein the confirmation is provided to the search service sub-unit 122 by the user terminal 21 as the data requestor.

For example, the data requestor may search the index data through the search service sub-unit 122 of the user terminal 21, search for the data corresponding to the search requirement, and confirm the search result. The transmission controller 132 may trigger/activate the smart contract running on the blockchain 22 via the blockchain interface 131 in response to the data requestor's confirmation of the search results.

In some embodiments, the user interface 111 may be configured to receive data request for performing the data transmission. The transmission unit 13 may further include: a smart contract service sub-unit 133. The smart contract service sub-unit 133 may be configured to provide a smart contract template through the user interface 111 according to the data request, and determine a smart contract that matches the data request based on the response information obtained from the user interface 111.

The data request may be specific requirement information corresponding to the automobile insurance, maintenance, P2P vehicle sharing, and vehicle networking consumption as described above. In some embodiments, the user interface 111 may receive data request of data transmission, for example, an automobile insurance service, a maintenance service, and the like.

The smart contract template may be a preset template file, and the smart contract template may be stored in a smart contract template library, and the smart contract service sub-unit 133 may provide a smart contract stored in the smart contract template library according to the data request. In some embodiments, the smart contract template library may store multiple smart contract templates, which may be smart contract templates respectively corresponding to different data request, for example, may include a vehicle insurance smart contract template corresponding to automobile insurance, or vehicle maintenance smart contract template corresponding to vehicle maintenance.

The response information may be response information corresponding to different service requirements, for example, may be response information corresponding to the needs of the automobile insurance service, or response information corresponding to the requirement of the automobile network consumption service. In some embodiments, the response information may be determined according to a specific application scenario.

In some embodiments, based on the smart contract template provided by the user interface 111 corresponding to the data request and the response information acquired from the user interface 111, the smart contract service sub-unit 133 may generate a corresponding a smart contract. For example, the smart contract service sub-unit 133 may modify the smart contract template obtained through the data request according to the response information, and then generate a smart contract based on the modified smart contract template.

The smart contract service sub-unit 133 may provide a smart contract template corresponding to the data request through the user interface 111 based on the data request of the data transmission, and determine a smart contract that matches the data request. The smart contract service sub-unit 133 may determine the smart contract template and the smart contract according to the service requirement, and may generate the smart contract corresponding to different data transmission requirements, thereby providing a variety of data transmission services.

Further, the data request may include information of a target blockchain. The blockchain interface 131 may be configured to support deployment of the smart contract to the target blockchain 22.

In some embodiments, the smart contract service sub-unit 133 may generate a smart contract corresponding to the data request according to the data request. Thereafter, based on the information of the target blockchain 22 in the data request, the smart contract service sub-unit 133 may deploy the smart contract to the target blockchain 22 through the blockchain interface 131.

For example, if the information of the target blockchain is information of Ethereum (ETH), the blockchain interface 131 may deploy the smart contract determined according to the data request (e.g., data request) to the ETH; if the target blockchain information is the information of the commercial distributed design blockchain operating system (EOS, or Ethereum Operating System), and the blockchain interface 131 may deploy the smart contract determined according to the data request to the EOS.

In some embodiments, the smart contract service sub-unit 133 may also invoke the smart contract through the blockchain interface 131 to interact with the blockchain 22 through the smart contract. Depending on the service, the specific smart contract and interactive data content may be different.

Those skilled in the art will appreciate that the above may be merely illustrative and is not a limitation of blockchain 22, data request, smart contracts, smart contract templates, and the like.

In some embodiments, the transmission unit 13 may further include: an adapter 134 configured to transmit data to the blockchain 22 via the blockchain interface 131 according to a data format and a communication mode. The blockchain 22 performs data transmission.

The number of the adapters 134 may be more than one. For example, the adapter 134 may include an adapter 134 that may be in one-to-one correspondence with the blockchain 22. The adapter 134 may perform data transmission with the blockchain 22. For example, the ETH adapter may perform data transmission with the ETH, and the EOS adapter may perform data transmission with the EOS. The adapters 134 corresponding to the different blockchains 22 may perform data transmission according to the requirements of the data block format and the communication mode of the different blockchains 22.

In some embodiments, the transmission data for data transmission may include one or more of data of a smart contract deployment and data of a smart contract, and no limitation may be imposed thereon.

The adapter 134 may perform data transmission through the blockchain interface 131 and the blockchain 22 in accordance with the requirements of the blockchain 22 for data format and communication mode. The adapter 134 may conform the data transmitted by the blockchain interface 131 and the blockchain 22 to the data format and communication mode of the blockchain. The adapter 134 also allows the user terminal to understand the specific way of data transmission with different blockchains, thereby improving the user terminal experience.

Further, the adapter 134 may be configured to convert data received from the user terminal 21 into a data format that conforms to the blockchain 22 requirements.

In some embodiments, different types of blockchains 22 require different data formats. The adapter 134 may convert the data format of the data received by the user terminal 21 to obtain data corresponding to the data format of the blockchain 22. For example, the adapter 134 corresponding to the ETH may convert the data received by the user terminal 21 into data corresponding to the data format of the ETH.

The adapter 134 may convert the data received from the user terminal 21 into a data format that conforms to the blockchain 22 requirements so that the data interacting with the blockchain 22 may conform to the data format requirements of the blockchain 22 without the need of having the user to understand the specific format, which in turn may enhance the user experience.

Referring back to FIG. 1, in some embodiments, the data service unit 12 may further include: a storage adapter 123. The storage adapter 123 may be configured to determine, by the user interface 111, a data storage location during the data transmission. For example, the storage adapter 123 may be configured to determine, by the user interface 111, a storage location in a data transmission process, or a data storage location in other data transmission scenarios.

In some embodiments, the storage location may include a centralized database, a data provider database, a decentralized database, and the like. The centralized database may be a database of the data service system 10 of the present disclosure, the data provider database may be a database of intelligent in-vehicle hardware, and the decentralized database may be an IPFS (Inter Planetary File System). It should be noted that the description herein may be merely an example and is not a limitation on the storage location.

In some embodiments, the storage adapter 123 may determine a data storage location for the stored data transmission process. The storage adapter 123 may determine a storage location according to the type of data, for example, large data may be stored in a data provider database, small data may be stored in a centralized database, or a decentralized database. Alternatively, the storage adapter 123 may also determine the storage location based on the selection of the data provider, for example, if the data provider chooses to store in a centralized database, the data of the data provider database may be transmitted to the centralized database storage. Alternatively, the storage adapter 123 may determine the storage location or the like according to the frequency of the data transmission, such as the transmission frequency of the data transmission, and the like, and will not be exemplified herein.

The storage adapter 123 may determine the storage location of the data in the data transmission process through the user interface 111, so that the data in the data transmission process may be stored to different storage locations, which may make the data storage more reasonable and optimize the data storage manner.

In some embodiments, the user interface 111 may be configured to perform data interaction with a data provider and a data requestor. The data service unit 12 may further include data uploading sub-unit 124 configured to obtain verification data from data provided by the data provider via the user interface 111 and upload the verification data via the blockchain interface 131, the verification data is used to verify the target data by the data requestor.

As previously mentioned, the interaction data for data interaction with the data provider and the data requestor may include verification data, index data, and encrypted data. The blockchain interface 131 may perform data transmission with the blockchain 22. In some embodiments, the data uploading sub-unit 124 may upload the verification data acquired from the data provider to the blockchain 22 through the blockchain interface 131, for example, the verification data may be uploaded to the ETH, or EOS. Specifically, the data uploading sub-unit 124 may upload the verification data to the target blockchain determined by the data request and the like as described above, and no limitation may be imposed thereon.

The data uploading sub-unit 124 may upload the verification data to the blockchain 22, so that the verification data for verifying the target data uploaded to the blockchain 22 may be made unchangeable, and thus, after the data transmission, for example, the data requestor may verify the obtained target data according to the verification data on the blockchain 22, and may verify the authenticity of the obtained data.

As mentioned earlier, the data provider's data may be stored to different storage locations. In some embodiments, the data provider may add or delete or modify data stored in the storage location. For example, the data provider may add or modify or delete all or part of the data in the storage location data.

In blockchain-based data transmissions, data transmissions need to meet the relevant provisions of the Privacy Protection Act, such as the European Union's General Data Protection Regulation (GDPR). The data provider may add or change or delete the data used for the transmission, so the data of the transmission may be data that may be added or changed or deleted by the data provider. Specific embodiments of the present disclosure also provide technical solutions suitable for use in the above scenarios, which are further described below.

In some embodiments, after the data requestor obtains the data from the storage location, that is, after obtaining the original data corresponding to the target data, the data requestor may verify whether the original data was added or deleted or modified. Therefore, under the premise that the data provider may add or delete or modify the data, the data requestor may verify whether the data provider performs the operation, thereby improving the security of the transmission and ensuring the data provider's data, thereby protecting the rights of data providers.

In some embodiments, the data service unit 12 may further include: an verification service sub-unit 125 configured to acquire original data corresponding to the target data, and verify the original data. The transmission unit 13 may further include: a verification invoking sub-unit 135 configured to invoke the verification service sub-unit 125 to verify the original data, and after the verification may be passed, trigger the target data generation sub-unit 121 to generate the target data.

In some embodiments, the verification service sub-unit 125 may receive the original verification data from the data provider. The original verification data may be obtained by the data provider to perform the hash operation on the data stored in the storage location. For the specific hash algorithm, refer to the foregoing, and no further details are provided herein.

The verification service sub-unit 125 may retrieve the raw data from the storage location in the data transmission. Thereafter, the verification service sub-unit 125 may perform a hash operation on the acquired original data, and compare the hash values generated by the two hash operations, thereby determining the authenticity of the original data obtained from the storage location.

If the comparison result determines that the hash values obtained by the two hash operations are consistent, the verification service sub-unit 125 may determine that the original data obtained from the storage location may be unmodified or undeleted data, and then the verification passes; if the hash may be determined that if the hash values obtained by the two hash operations are inconsistent, the verification service sub-unit 125 may determine that the original data acquired from the storage location may be added or modified or deleted, and the verification fails.

The verification service sub-unit 125 may obtain the original data corresponding to the target data, and the verification invoking sub-unit 135 calls the verification service sub-unit 125 to verify the original data. After the verification passes, the target data generation sub-unit 121 is triggered/activated to generate the transmission. The data may improve the validity of the generated target data, increase the probability of successful data transmission, and reduce the waste of system resources.

In some embodiments, the original data may be a data packet, and the verification service sub-unit 125 may obtain the original verification data of the data packet from the data provider. The data packet may include index data, verification data, and encrypted data as described above. The data provider adds or modifies or deletes the original data by adding or deleting or modifying all or part of the data in the data packet. For example, the data provider may delete only encrypted data, or just delete indexed data. In other embodiments, the data provider may also be deleting the entire data packet.

In some embodiments, data uploading sub-unit 124 may upload the verification data for verifying the authenticity of the encrypted data to blockchain 22. The verification data uploaded to the blockchain 22 cannot be added or deleted or changed. The verification data uploaded to the blockchain 22 may be associated with the data stored in the storage location. If the data provider adds or deletes or modifies the data stored in the storage location, the association between the verification data on the blockchain 22 and the data stored in the storage location will change. The data service system 10 may terminate the transmission by determining that the association relationship has changed to determine that the data of the storage location has been incremented or deleted or changed.

In some embodiments, the target data generation sub-unit 121 may be configured to encrypt data received from the user terminal 21 to generate target data.

As mentioned earlier, different the data providers may provide different data to the user terminal 21. In some embodiments, the target data generation sub-unit 121 may encrypt the data acquired from the data provider. For example, the data acquired by the user terminal 21 of the data provider may be plaintext data; the target data generating sub-unit 121 may perform an encryption operation on the acquired plaintext data to generate encrypted data corresponding to the plaintext data.

In some embodiments, the encryption operation on the acquired plaintext data may be an encryption operation performed on the plaintext data by using asymmetric encryption. For example, the algorithms involved in the asymmetric encryption operation may be an RSA algorithm, an Elgamal algorithm, a knapsack algorithm, a Rabin algorithm, a DH algorithm, an ECC (Error Correcting Code), etc., and the selection of the specific encryption algorithm may be not limited herein. In other embodiments, other encryption methods are also possible.

The target data generation sub-unit 121 may perform encryption operation on the data acquired from the data provider to generate encrypted data, which may avoid data being abnormally acquired in the absence of the decryption key, thereby enhancing the security of the data transmission.

In some embodiments, the target data generating sub-unit 121 may re-encrypt the encrypted data encrypted from the obtained plaintext data to generate target data corresponding to the encrypted data. Or the data obtained by the user 21 of the data provider is already encrypted data, and the target data generating sub-unit 121 may re-encrypt the encrypted data to generate corresponding target data based on the information of the data provider and the information of the data requestor.

The information of the data provider and the information of the data requestor may be information of an encryption key corresponding to data re-encryption, and the re-encryption key may be based on a private key of the data provider and a data requestor. In some embodiments, the data provider and the data requestor may generate respective corresponding public-private key pairs by utilizing a preset public-private key pair generator. The public-private key pair generator may be a software implemented by a software, or may be an offline hardware key generation tool.

In some embodiments, the encrypted data may be data encrypted by the data provider's public key. When the data provider and the data requestor establish an order, the data requestor can send its public key to the data provider through the data service system 10. The data provider can generate a re-encryption key based on its own private key and the public key of the data requestor.

According to some embodiments, data service system 10 may also include a re-encryption key verification unit. In some embodiments, after the data provider generates the re-encryption key, the re-encryption key verification unit may verify the generated re-encryption key, and the re-encryption key may be verified in various manners. In order to avoid key leakage caused by the verification process, zero-knowledge proof may be used for verification. In other embodiments, when the re-encryption key verification unit verifies the re-encryption key, the time stamp of the re-encryption key may also be verified, or may be verified by digital signature.

Figure 3:
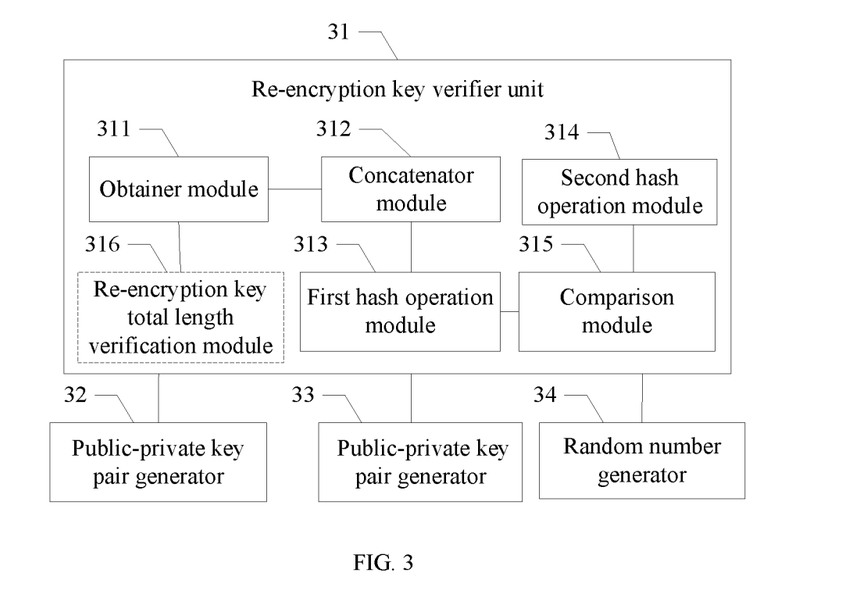
FIG. 3 is a schematic structural diagram of a re-encryption key verification system according to embodiments of the present disclosure.

According to some embodiments, the re-encryption key is verified by the zero-knowledge proof method, and the specific verification method will be described in detail below with reference to FIG. 3.

According to some embodiments, the obtainer module 311 of a re-encryption key verifier unit 31 may obtain the public key of a public-private key pair generator 32 of the data provider, the public key of a public-private key pair generator 33 of the data requestor, and the fixed length random number of the re-encryption key. Wherein, the fixed length random number may be a string, a number, or a combination of the two, and a preset random number generator 34 is used to generate a fixed length random number of the re-encryption key.

Further, after the obtainer module 311 obtains the public key of the data provider, the public key of the data requestor, and the fixed-length random number of the re-encryption key, the public key of the data provider, the public key of the data requestor, and the fixed-length random number of the re-encryption key are concatenated by a concatenator module 312 to obtain a concatenated value.

In some embodiments, the concatenating module 312 may concatenating the public key of the data provider, the public key of the data requestor, and the fixed-length random number of the re-encryption key in a preset order, or may also be used to facilitate the re-encryption. The key may be concatenated in the manner of verification, and no specific limitation may be imposed on this.

In some embodiments, after the concatenating module 312 obtains the concatenating value, the first hashing module 313 may perform a hash operation on the concatenating value to obtain a hash value corresponding to the concatenating value. For example, the first hash operation module 313 may perform a hash calculation on the concatenated value by using a preset hash algorithm to obtain a hash value corresponding to the concatenated value. For details, refer to the foregoing, and no further details are described herein.

In some embodiments, the comparison module 315 may compare the hash value of the concatenated value generated by the first hash operation module 313 with the hash value of the re-encryption key generated by the second hash generation module 314, and verify whether the hash value of the concatenated value is consistent with the hash value of the re-encryption key, thereby determining whether the re-encryption key may be correct.

In some embodiments, if the verification result is consistent, it may be determined that the re-encryption key may be correct; if the verification result is inconsistent, the re-encryption key may be determined to be incorrect.

The verification result is obtained by concatenating the obtained public key of the data provider, the public key of the data requestor, and the fixed-length random number of the re-encryption key, hashing the hash value of the concatenated value, and then determining whether the hash value of the re-encryption key and the hash value of the concatenated value are consistent, thereby the security of the data transmission can be guaranteed.

In some embodiments, the re-encryption key total length verification module 316 may also perform re-encryption before the obtaining module 311 acquires the public key of the data provider, the public key of the data demander, and the fixed-length random number of the re-encryption key to verify the total length of the key to determine whether the total length of the re-encryption key is a preset length value.

In some embodiments, the preset length value of the re-encryption key is fixed. By verifying whether the total length of the re-encryption key is a preset length value to determine whether continue to proceed according to the verification result, system resources may be saved.

For example, the preset length value of the re-encryption key may be 56 bits. If the total length of the re-encryption key is 64 bits, the re-encryption key verification fails, and the verification result may be returned to the data provider. If the total length of the re-encryption key is consistent with the preset length, the re-encryption key verification may be successful, and the obtaining module 311 may acquire the public key of the data provider, the public key of the data requestor, and the fixed-length random number of the re-encryption key may be obtained to perform a subsequent verification process of the re-encryption key.

The re-encryption key total length verification module 316 may re-encrypt the key before the obtaining module 311 acquires the public key of the data provider, the public key of the data requestor, and the fixed-length random number of the re-encryption key. The total length may be verified, and it may be determined whether to continue the verification of the re-encryption key based on the verification result, which may improve the verification efficiency and reduce system resource waste.

In some embodiments, the re-encryption key total length verification module 316 may also verify the re-encryption key in other manners. For example, the re-encryption key total length verification module 316 may verify the time stamp of the re-encryption key and verify whether the specific time point when the re-encryption key may be generated may be a preset time point. Alternatively, the re-encryption key total length verification module 316 may verify the re-encryption key by means of a digital signature, and verify whether the digest may be a preset digest.

According to some embodiments of the present disclosure, if the verification result of the re-encryption key may be correct, the encrypted data may be re-encrypted by using the re-encryption key to generate encrypted data.

After the data requestor obtains the target data, the target data may be decrypted based on the private key generated by the data requestor public private key pair generator 33 to obtain the plaintext data of the target data.

The data provider may generate a re-encryption key by using the public key of the data provider and the private key of the data requestor, and encrypt the encrypted data by using the re-encryption key, so that the generated target data may be strictly private to the data requestor. The key may be decrypted to improve the security of the data transmission.

According to some embodiments of the present disclosure, if the verification result of the re-encryption key shows that the re-encryption key is not transmitted correctly, the data service system 10 may transmit the verification result to the data provider such that the data provider resends the re-encryption key. For example, if the verification result of the re-encryption key shows that the re-encryption key is not transmitted correctly, the data service system 10 may send the verification result to the data provider. The data provider may then resend the re-encryption key to continue the transmission.

For example, if the data provider considers that its own re-encryption key is correct, the re-encryption key may be sent again. If the data provider finds that its re-encryption key is wrong, it may regenerate a new re-encryption key and send it again.

By sending the verification result to the data provider, the data provider may know the reason for the interruption of the transmission and select an appropriate processing scheme to improve the efficiency of the data transmission.

Continue referring to FIG. 1, in some embodiments, the data service unit 12 may include a security service sub-unit, which may be configured to manage login names and/or passwords of the data providers and/or data requestors, as well as conducting user authorization management. In some embodiments, the target data generation sub-unit 121 may invoke the security service sub-unit for proxy re-encryption.

In some embodiments, the generated target data may be stored in a database of the data service system 10, and the target data may be supplied to the data requestor through a plurality of transmission methods.

For example, the target data generation sub-unit 121 may generate a storage address of a specified period of time, and store the target data to the storage address. The data service system 10 may issue the data storage address for storing the target data to the data requestor via emails or short messages. Thereby the data requestor can obtain the target data.

The target data generation sub-unit 121 may encrypt the data received from the data provider based on the information of the data provider and the information of the data requestor, so that the generated encrypted data may be targeted, and the target data may be corresponding to the data provider and the data requestor only, which increases the security of the data transmission.

Figure 4:
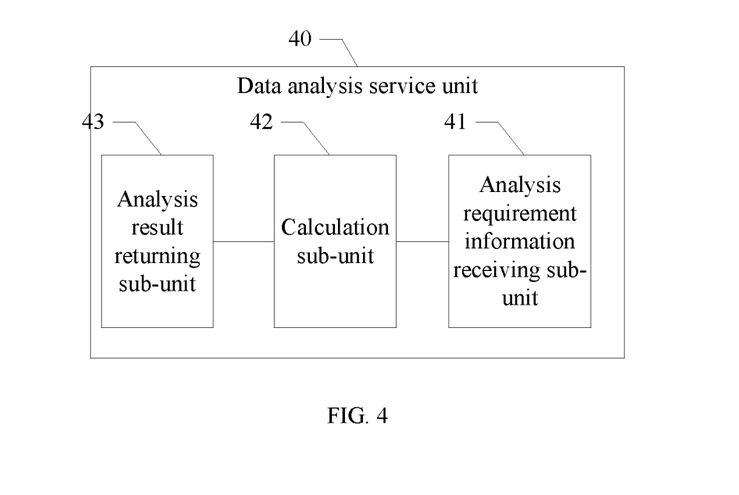
FIG. 4 is a schematic structural diagram of a data analysis service unit according to embodiments of the present disclosure.

With reference to FIG. 1 and FIG. 4, in accordance with some embodiments of the present disclosure, the data service system 10 (shown in FIG. 1) may further include: a data analysis service unit 40, which may include:

An analysis requirement information receiving sub-unit 41, configured to receive analysis requirement information from the user interface 111, the analysis requirement information indicating an analysis requirement for the data;

The calculation sub-unit 42 configured to analyze and calculate the data received from the user interface 111 according to the analysis requirement information to obtain an analysis result;

An analysis result returning sub-unit 43 configured to return the analysis result through the user interface 111 in response to the analysis requirement information.

The analysis requirement information may be a user terminal's analysis requirement to the data, and may be a statistical analysis requirement for a large amount of data in the big data field, and may include specific analysis parameters and indicators. For example, the analysis requirement information may be an analysis requirement information of the insurance company on driving behavior, and may include classification of driving behavior, and analysis indicators of different driving behaviors.

The calculation object of the calculation sub-unit 42 may be data received from the user interface 111, which may be historical data or real-time data. The calculation sub-unit 42 may be specifically calculated in various manners, for example, Multi-Party Computation (MPC) may be performed, and distributed computing units are invoked, and there may be no trust relationship between the distributed computing units, so that the calculation may be improved. The calculation speed may be more suitable for big data analysis.

The calculation sub-unit 42 may calculate the data encrypted in a manner that may be homomorphic. The data obtained from the data provider may be homomorphic encrypted data, and the data privacy may be protected by analyzing the homomorphic data.

In order to enable a person skilled in the art to better understand and implement the embodiments of the present disclosure, the data transmission process and the data transmission process will be described in detail through a specific application scenario in conjunction with FIG. 5 and FIG. 6.

Data transmission and transmission system 500 may include data collection device 51, data processing unit 52, blockchain adaptor 55, blockchain 56, storage adapter 53, storage location (e.g., memory) 54, in accordance with some embodiments. The data verification module 57, and the target data generation sub-unit 58.

Figure 5:
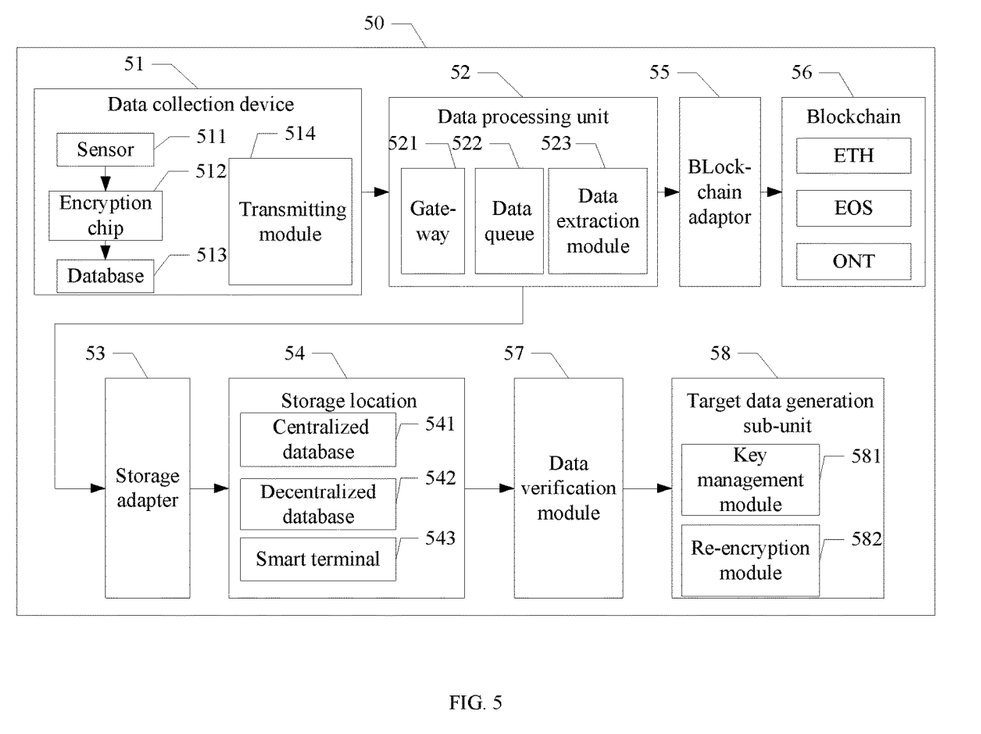
FIG. 5 is a partial structural diagram of another data service system according to embodiments of the present disclosure.

Referring to FIG. 5, the data collection device 51 collects data (a.k.a. "raw data") supplied from the data provider. For example, sensor 511 of data collection device 51 may collect data provided from a data provider. Taking the vehicle data as an example, the sensor 511 of the data collecting device 51 may be a voltage sensor of a vehicle, a tire pressure sensor, or the like (i.e., "raw data").

In some embodiments, after collecting the raw data, the data collection device 51 may perform a hash operation on the collected data, generate verification data corresponding to the collected data, and generate index data corresponding to the collected data (a.k.a., collectively "original data").

In some embodiments, the encryption chip 512 of the data collection device 51 may encrypt the raw data collected by the sensor 511 to obtain encrypted data.

For example, the encryption chip 512 may encrypt the collected raw data by using an asymmetric encryption algorithm. For details, refer to the foregoing, and no further details are provided herein.

In other embodiments, the data collected by the sensor 511 may also be directly uploaded to the data service system 10, and the data service system 10 may encrypts the raw data and generate index data.

In some embodiments, after the data collection device 51 generates the encrypted data, the index data, and the verification data (a.k.a., collectively, "original data"), the system 500 may store the original data to a specified location according to the requirements of the data provider.

For example, the data collection device 51 may store the original data in the database 513 of the collection device 51, or may upload the original data to the gateway 521 via transmitting module 514. The data queue 522 of the data processing unit 52 may first buffer the original data. The data extraction module 523 then may perform data extraction on the original data. The storage adapter 53 may then store the original data that are subjected to the above processing (a.k.a. "processed data") to the storage location 54, which is designated by the data provider.

The original data may be temporarily stored and buffered by the data queue 522, and then the buffered original data may be processed by the data extraction module 523.

For example, the data extraction module 523 may perform data dimension expansion on the index data, which are uploaded by the data provider. Alternatively, if the data provider uploads the plaintext data, the data extraction module 523 may encrypt the plaintext data and perform data extraction to generate index data. Alternatively, the data extraction module 523 may parse the data downloaded from the third party from cloud to obtain data for the data service system 10.

As described above, the original data processed by the data queue 522 and the data processing module 523 (a.k.a. "processed data") may be stored by the storage adapter 53 to the storage location 54 designated by the data provider.

For example, according to the storage requirements of the data provider, the data uploaded to the data service system may be stored to a storage node of a decentralized database 542 through the storage adapter 53 that interfaces with the decentralized storage database 542, such as the storage node of the IPFS. Alternatively, the uploaded data may be stored to a centralized database 541 or the like.

In some embodiments, the processed data stored to storage location 54 may be transmitted to other databases based on the storage requirements of the data provider.

For example, the processed data may be originally stored in the centralized database 541. Based on the storage requirements of the data provider, the storage adapter 53 may transmit the processed data to a data provider, such as the in-vehicle smart terminal 543, or to the storage node of the decentralized database 542, and the like.

It should be noted that the description herein is merely an example, and is not a limitation on the storage mode and the storage location 54.

In some embodiments, after the data service system 10 obtains data from the data provider, the acquired verification data may be uploaded to the blockchain 56 through the blockchain interface.

Specifically, the blockchain adaptor 55 may determine the data format and communication mode requirements of the blockchain 56, and then the data may be transmitted to the blockchain 56 through the blockchain interface, for example, the block link. The port may transmit data to ETH, or EOS, or ONT.

In some embodiments, the transmitting module 514 obtaining data from the data provider may further include obtaining original verification data of the data to be stored ("processed data") from the data provider.

For example, the data to be stored obtained from the data provider may be a data packet, and the data packet may include at least one of verification data, index data, and encrypted data, and the original verification data may be data after the data packet may be hashed. The acquired raw verification data may be stored in the data service system.

In some embodiments, the transmission of data transmissions may be controlled by smart contracts running on blockchain 56. The smart contract service sub-unit 133 may generate a smart contract based on the smart contract template provided by the smart contract template database, and the blockchain interface deploys the generated smart contract to the corresponding blockchain 56. It should be noted that the blockchain 56 herein may be the blockchain 22 described in FIG. 2.

Figure 6:
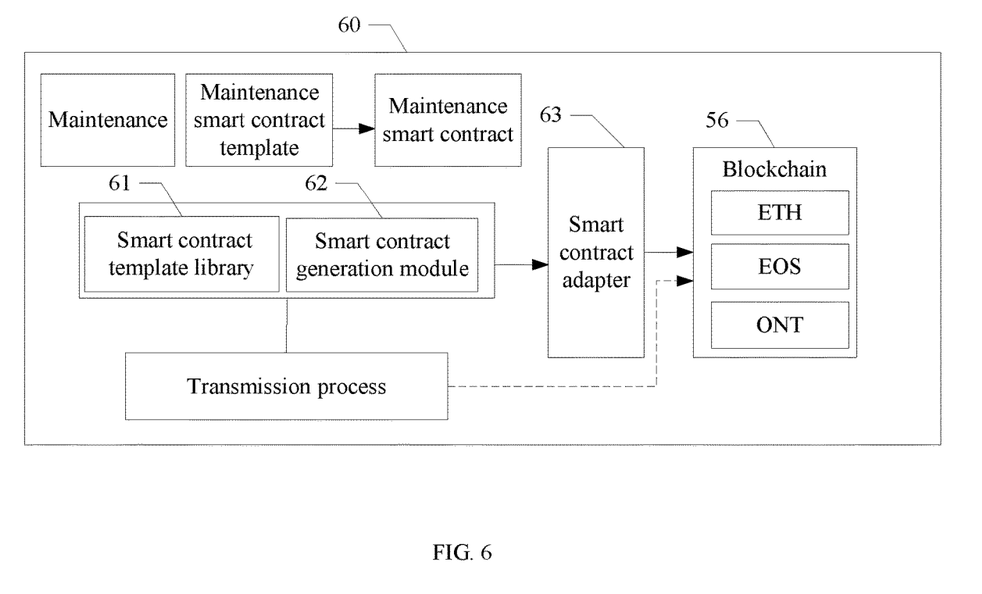
FIG. 6 is a partial structural diagram of another data service system according to embodiments of the present disclosure.

Referring to FIG. 6, in a specific service process, the specific service may be a maintenance service. The smart contract template provided by the smart contract template library 61 may be the corresponding maintenance smart contract template. The smart contract generation module 62 may generate a maintenance smart contract based on the maintenance service requirements and the maintenance smart contract template.

The blockchain interface may be configured to the corresponding blockchain 56 in accordance with the requirements of the smart contract for the blockchain 56 determined by the smart contract adapter 63.

For example, if the generated smart contract may be a smart contract corresponding to ETH, the blockchain interface may deploy the smart contract to ETH; if the generated smart contract is a smart contract corresponding to EOS, the blockchain interface may be the smart contract to EOS.

The ordering of the data transmission, the transaction amount payment of the data transmission, and the like may be realized by the blockchain interface calling the smart contract deployed to the blockchain 56.

For example, when generating a transmission order, the blockchain interface may call the smart contract of the blockchain 56 to execute the request for the transmission order. When the data transmission goes to the stage of making payment, the smart contract may control and supervise the data service system 10 to pay the transaction amount.

For the transmission of data transactions, the following examples are further described.

Continue referring to FIG. 5, in a particular implementation, the data requestor may perform a data search based on the blockchain 56 or index data stored by the data service system. For example, the data requestor may perform data search on the index data stored by the data service system through the search service sub-unit to determine the data that needs to be purchased.

After the data requestor determines the searched data through the search service sub-unit, the smart contract deployed to the blockchain 56 may be invoked through the blockchain interface to place an order for the searched data to generate a transmission order. In some embodiments, the data provider may be multiple, and the generated transmission order may be a transmission order corresponding to multiple data providers.

Based on the generated transmission order, the data service system may request the data provider to conduct data transmission by mail or SMS. In some embodiments, when there are multiple data providers, the data service system may request that the data transmission be sent to multiple data providers separately, for example, multiple data supply by email or short message. The party sends a data transmission request.

Further, based on the data provider's confirmation operation on the data transmission request, the data service system may acquire the data packet stored in the storage location 54 based on the uploaded verification data, and verifies the acquired data packet.

For example, the data service system may perform a hash operation on the data packet (e.g., the data packet includes the processed data) acquired by the storage location 54 to generate the packet verification data; then the data verification module 57 may verify the data for the data packet and the pre-stored original verification data may be compared to determine if the data at storage location 54 has been added, deleted or changed to determine if the data transmission continues to execute.

In some embodiments, if the packet verification data and the pre-stored original verification data are inconsistent, it may be determined that the data of the storage location 54 has been added, deleted or modified, and the data service system may terminate the data transmission under the supervision and instruction of the smart contract.

In another specific implementation, if the data verification module 57 determines that the data packet acquired by the data provider may be data that has not been added, modified or deleted, the data transmission may continue to be performed under the supervision and instruction of the smart contract. The target data generation sub-unit 58 may re-encrypt the acquired encrypted data to obtain target data.

The specific implementation of the target data generation sub-unit 58 and the specific implementation of other units may be referred to the foregoing. In some embodiments, the encryption key for re-encrypting the encrypted data may be generated by the data provider's device. Specifically, the data provider's device may be based on the data provider's key pair generated by the generator and the data requestor. The public key generated by the key pair generator may generate a re-encryption key. The public key obtained by the data provider to obtain the data requestor may be obtained by the data service system, or may be directly sent by the data requestor to the data provider.

In some embodiments, the generated re-encryption key may be uploaded to the key management module 581 for use by the re-encryption module 582 to re-encrypt the encrypted data acquired by the storage location 54 to generate target data.

In some embodiments, the data service system may include one or more of the aforementioned various units to meet the needs of different scenarios.

The data service system in the embodiment of the present disclosure provides an user interface configured to perform data interaction with the user terminal through the interface service unit, and the transmission unit provides a blockchain interface configured to perform data transmission with the blockchain. The transmission controller in the transmission unit may trigger/activate the smart contract running on the block chain to control the data transmission process, so that the data service may be provided for the diverse data transmission requirement, so that all parties of the data transmission may complete the data transmission via the data service system in the embodiment of the present disclosure.

The explanation of the terms, the working principles, the specific implementations, and the beneficial effects of the data processing apparatus in some embodiments may refer to the data processing method in some embodiments, and details are not described herein again.

The embodiment further provides a computer readable storage medium, where computer instructions are stored, and the steps of the data processing method may be executed when the computer instruction being performed. For details, refer to the foregoing embodiments, and details are not described herein again.

The computer readable storage medium may be an optical disk, a mechanical hard disk, a solid-state hard disk, or the like.

The embodiment further provides a terminal, comprising a memory with computer instructions stored thereon and a processor, the computer instructions are executable on the processor, and when executed by the processor, perform the steps of the data processing method. Specific steps may refer to the above-mentioned embodiments and details are not described herein again.

Figure 7:
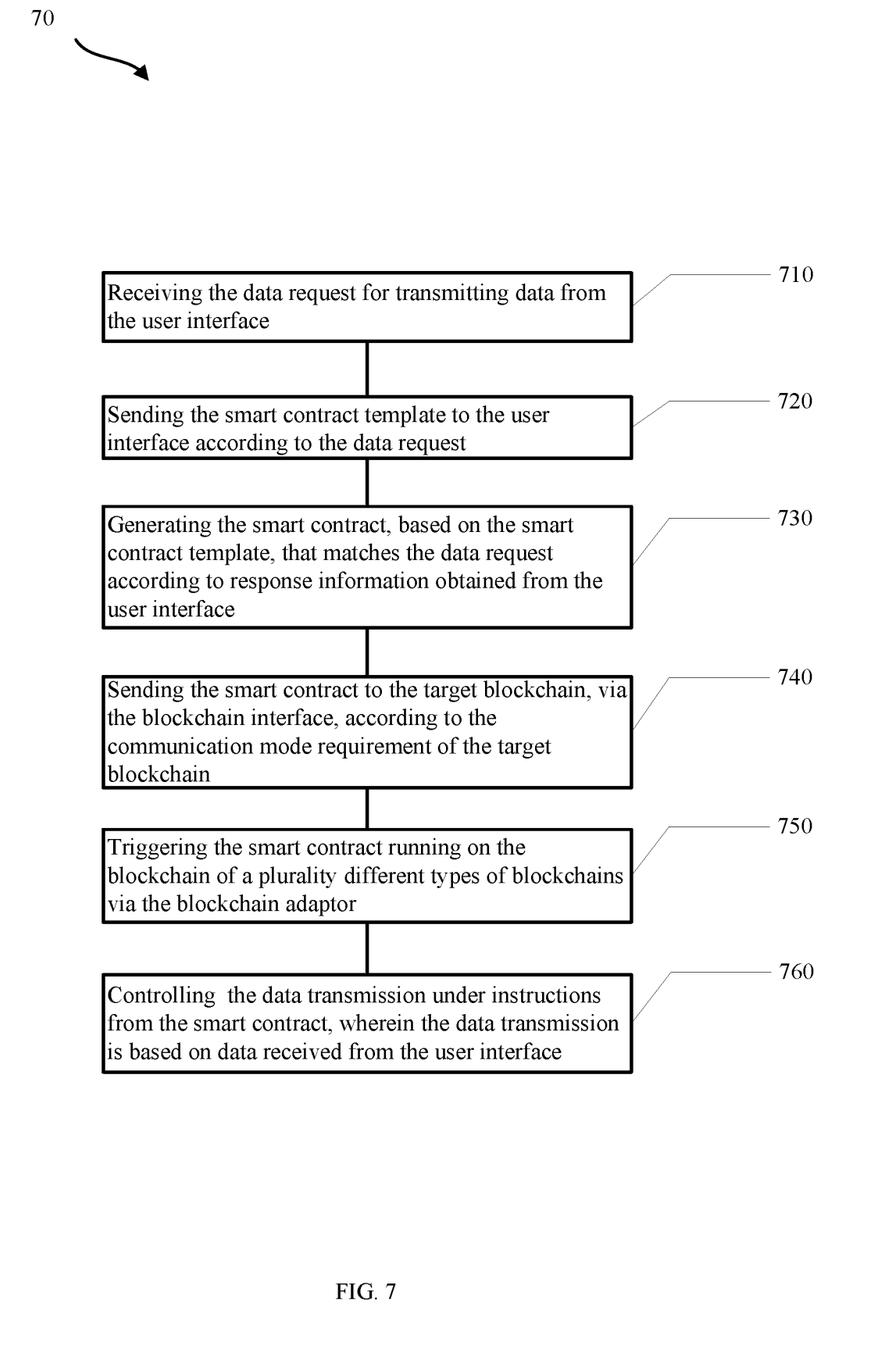
FIG. 7 is a flowchart illustrating a process of data transmission implemented by the data service system according to embodiments of the present disclosure.

FIG. 7 is a flowchart illustrating a process 70 of data transmission implemented by the data service system according to embodiments of the present disclosure. The method may be operated by the data service system introduced above.

In step 710, receiving, by the user interface, the data request for transmitting data from the user interface, wherein the data request includes information of a target blockchain.

In step 720, sending, by the transmission unit, the smart contract template to the user interface according to the data request. To this end, the transmission unit is configured to obtain the data format requirement of the target blockchain from the plurality of different types of blockchains and convert the data to conform with the data format required by the target blockchain.

In step 730, generating, by the transmission unit, the smart contract, based on the smart contract template, that matches the data request according to response information obtained from the user interface.

In step 740, sending, by the blockchain adaptor, the smart contract to the target blockchain, via the blockchain interface, according to the communication mode requirement of the target blockchain.

In step 750, triggering, by the transmission controller, the smart contract running on the blockchain of a plurality different types of blockchains via the blockchain adaptor, wherein the blockchain adaptor is configured to transmit data to the plurality of different types of blockchains according to data format and communication mode requirements of each of the plurality of different types of blockchains.

In step 760, controlling, by the transmission controller, the data transmission under instructions from the smart contract, wherein the data transmission is based on data received from the user interface. To this end, the process further includes:

Generating target data supporting data transmission based on data received through the user interface; and performing control on a data transmission process of the target data under supervision of the smart contract.

Respectively communicating with one or more centralized database, decentralized database and smart terminal devices and determining a data storage location during the data transmission process via the user interface.

Obtaining verification data from data provided by at least one data provider via the user interface and uploading the verification data to the blockchain via the blockchain adaptor, wherein the verification data is configured to verify the target data by the data requestor.

Obtaining original data corresponding to the target data and verify the original data and verifying the original data and generating the target data after passing verification.

Encrypting data received from the data provider based on information of the data provider and information of the data requestor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural components that do not differ from the literal language of the claims, or if they include equivalent structural components with insubstantial differences from the literal languages of the claims.

What may be claimed is:

1. A system, comprising:
   at least one non-transitory storage medium storing a set of instructions for data service; and
   at least one processor in communication with the at least one storage medium, wherein during operation, the at least one processor executes the set of instructions to;
   receive, via a user interface, plaintext data from a user terminal of a data provider;
   encrypt the plaintext data by a public key of the data provider, to generate encrypted data corresponding to the plaintext data;
   upon establishment of an order from a data requester, re-encrypt the encrypted data to generate target data corresponding to the encrypted data;
   generate a concatenated value based on the public key of the data provider, a public key of the data requestor, and a fixed-length random number of a re-encryption key, wherein the re-encryption key is generated by the data provider;
   perform a hash operation on the concatenating value to obtain a hash value corresponding to the concatenating value for verifying the re-encryption key;
   trigger, by a transmission controller, a smart contract running on a blockchain of a plurality different types of blockchains via a blockchain interface; and
   transmit, by a blockchain adaptor via the blockchain interface, the target data to the blockchain of the plurality of different types of blockchains,
   wherein the blockchain adaptor is configured to adapt the different types of blockchains according to format of the target data and communication mode requirements of each of the plurality of different types of blockchains, and
   transmission of the target data is controlled by the transmission controller under instructions from the smart contract.

2. The system of claim 1, wherein the user interface is configured to receive a data request for transmitting the target data, and the at least one processor further executes the set of instructions to:
   send a smart contract template to the user interface according to the data request; and
   generate a smart contract, based on the smart contract template, that matches the data request according to response information obtained from the user interface.

3. The system of claim 2, wherein the data request includes information of a target blockchain, and the at least one processor further executes the set of instructions to:
   obtain a data format requirement of the target blockchain from the plurality of different types of blockchains and convert the target data to conform with the data format required by the target blockchain; and
   send, by the blockchain adaptor, the smart contract to the target blockchain, via the blockchain interface, according to a communication mode requirement of the target blockchain.

4. The system of claim 1, wherein the at least one processor further executes the set of instructions to: instructions to:
   provide a data processing service and generate the target data supporting data transmission based on the plaintext data received through the user interface; and
   perform control on a data transmission process of the target data under supervision of the smart contract.

5. The system of claim 4, wherein the at least one processor further executes the set of instructions to:
   generate search index data based on the plaintext data received from the data provider and search the target data based on the search index for the data requestor.

6. The system of claim 5, wherein the transmission controller is configured to trigger the smart contract running on the blockchain via the blockchain interface according to a confirmation from the data requestor on search results.

7. The system of claim 4, wherein the at least one processor further executes the set of instructions to:
   respectively communicate, by a storage adaptor, with one or more centralized database, decentralized database and smart terminal devices; and determine, by the storage adaptor, a data storage location during the data transmission process via the user interface.

8. The system of claim 4, wherein the at least one processor further executes the set of instructions to:
obtain verification data from the plaintext data provided by the data provider via the user interface, and
upload the verification data to the blockchain via the blockchain interface, the verification data is configured to verify the target data by the data requestor.

9. The system of claim 4, wherein the at least one processor further executes the set of instructions to:
obtain original data corresponding to the target data and verify the original data; and
verify the original data and trigger a target data generator to generate the target data after passing verification.

10. The system of claim 6, wherein the target data generator is configured to encrypt the plaintext data received from the user to generate the target data.

11. The system of claim 6, wherein the target data generator is configured to encrypt the plaintext data received from the data provider based on information of the data provider and information of the data requestor.

12. The system of claim 1, wherein the at least one processor further executes the set of instructions to:
receive analysis requirement information from the user interface, the analysis requirement information indicating an analysis requirement to the plaintext data;
analyze and calculate the plaintext obtained from the user interface according to the analysis requirement information to obtain an analysis result; and
return the analysis result via the user interface in response to the analysis requirement information.

13. A method, comprising:
receiving plaintext data from a user terminal of a data provider;
encrypting the plaintext data by a public key of the data provider, to generate encrypted data corresponding to the plaintext data;
upon establishment of an order from a data requester, re-encrypting the encrypted data to generate target data corresponding to the encrypted data;
generating a concatenated value based on the public key of the data provider, a public key of the data requestor, and a fixed-length random number of a re-encryption key, wherein the re-encryption key is generated by the data provider;
performing a hash operation on the concatenating value to obtain a hash value corresponding to the concatenating value for verifying the re-encryption key;
triggering a smart contract running on a blockchain of a plurality different types of blockchains via a blockchain adaptor, wherein the blockchain adaptor is configured to transmit the target data to the plurality of different types of blockchains according to data format and communication mode requirements of each of the plurality of different types of blockchains; and
controlling a data transmission under instructions from the smart contract, wherein the data transmission is based on the plaintext data received from a user interface.

14. The method of claim 13, further comprises:
receiving a data request for transmitting the target data from the user interface;
sending a smart contract template to the user interface according to the data request; and
generating a smart contract, based on the smart contract template, that matches the data request according to response information obtained from the user interface.

15. The method of claim 14, wherein the data request includes information of a target blockchain, and the method further includes:
obtaining a format requirement of the target blockchain from the plurality of different types of blockchains and converting the target data to conform with the data format requirement by the target blockchain; and
sending the smart contract to the target blockchain, via the blockchain adaptor, according to a communication mode requirement of the target blockchain.

16. The method of claim 13, further comprises:
generating the target data supporting data transmission based on the plaintext data received through the user interface; and
performing control on a data transmission process of the target data under supervision of the smart contract.

17. The method of claim 16, further comprises:
respectively communicating with one or more centralized database, decentralized database and smart terminal devices, and
determining a data storage location during the data transmission process via the user interface.

18. The method of claim 16, further comprises:
obtaining verification data from the plaintext data provided by at least one data provider via the user interface, and
uploading the verification data to the blockchain via the blockchain adaptor, wherein the verification data is configured to verify the target data by the data requestor.

19. The method of claim 16, further comprises:
obtaining original data corresponding to the target data and verify the original data; and
verifying the original data and generating the target data after passing verification.

20. The method of claim 16, further comprises encrypting the plaintext data received from the data provider based on information of the data provider and information of the data requestor.

* * * * *